(12) United States Patent
Alrod et al.

(10) Patent No.: US 8,719,677 B2
(45) Date of Patent: May 6, 2014

(54) USING ECC ENCODING TO VERIFY AN ECC DECODE OPERATION

(75) Inventors: Idan Alrod, Herzliya (IL); Eran Sharon, Rishon Lezion (IL); Simon Litsyn, Givat Shmuel (IL)

(73) Assignee: Sandisk Technologies Inc., Plano, TX (US)

( * ) Notice: Subject to any disclaimer, the term of this patent is extended or adjusted under 35 U.S.C. 154(b) by 160 days.

(21) Appl. No.: 13/335,393

(22) Filed: Dec. 22, 2011

(65) Prior Publication Data

US 2013/0166986 A1 Jun. 27, 2013

(51) Int. Cl.
*H03M 13/00* (2006.01)

(52) U.S. Cl.
USPC .................. 714/776; 714/766; 714/782

(58) Field of Classification Search
USPC .......... 714/776, 773, 766, 805, 782, 767, 512
See application file for complete search history.

(56) References Cited

U.S. PATENT DOCUMENTS

| 5,250,568 | A | * | 10/1993 | Kruger et al. ................. 514/512 |
| 5,832,005 | A | * | 11/1998 | Singh ........................... 714/805 |
| 7,398,449 | B1 | | 7/2008 | Normoyle et al. |
| 7,823,043 | B2 | | 10/2010 | Lasser |
| 8,042,029 | B2 | | 10/2011 | Alrod et al. |
| 2005/0149841 | A1 | | 7/2005 | Kyung et al. |
| 2007/0124652 | A1 | | 5/2007 | Litsyn et al. |
| 2007/0283214 | A1 | | 12/2007 | Lasser |
| 2010/0223534 | A1 | | 9/2010 | Earnshaw et al. |

FOREIGN PATENT DOCUMENTS

| WO | 2009041153 A1 | 4/2009 |
| WO | 2009107267 A1 | 9/2009 |

OTHER PUBLICATIONS

"Error Detection and Correction," Wikipedia, http://en.wikipedia.org/wiki/Error_detection_and_correction, printed Dec. 22, 2011, 9 pages.
International Search Report and Written Opinion mailed Jun. 12, 2013 in International Application No. PCT/US2012/070008, 15 pages.

* cited by examiner

*Primary Examiner* — Fritz Alphonse
(74) *Attorney, Agent, or Firm* — Toler Law Group, PC

(57) ABSTRACT

A method includes initiating a decoding operation of a first portion of a codeword representation to generate a set of data bits. The first portion includes first parity bits and is associated with a first error correcting code. The method includes initiating an encoding operation of the set of data bits according to a second error correcting code to generate computed parity bits. The method includes comparing the computed parity bits to a second portion of the codeword representation to determine a number of bits that differ between the computed parity bits and the second portion of the codeword representation. The method also includes generating an indication of successful decoding in response to the number of bits that differ being less than a threshold value.

25 Claims, 2 Drawing Sheets

USING ECC ENCODING TO VERIFY AN ECC DECODE OPERATION

FIELD OF THE DISCLOSURE

The present disclosure is generally related to decoding error correction coding (ECC) data.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase storage density of a memory device, a bit error rate of data stored at the memory device may also increase.

Error correction coding (ECC) is often used to correct errors that occur in data read from a memory device. Prior to storage, data may be encoded by an ECC encoder to generate redundant information (e.g. "parity bits") that may be stored with the data. As more parity bits are used, an error correction capacity of the ECC increases and a number of bits required to store the encoded data also increases.

Multi-phase ECC decoding can include a first phase of ECC decoding using a reduced set of parity bits for individual chunks of data and a second phase of ECC decoding using a larger set of parity bits. The larger set of parity bits can be used for more powerful decoding of a chunk that is not decodable using the reduced set of parity bits. The larger set of parity bits need not be stored for each individual chunk of data but may instead by generated for one or more chunks based on other chunks that have been successfully decoded.

However, even when the first phase of ECC decoding indicates success, in some cases the first phase of ECC decoding determines a valid ECC codeword that does not correspond to the original data. In these cases, the first phase of ECC decoding fails to generate the correct data but indicates a successful result. Although cyclic redundancy check (CRC) check bits may be encoded within an ECC codeword stored in the memory and used to identify that the decoded data differs from the original data, adding CRC check bits increases an amount of additional information stored in the memory and reduces information storage density in the memory.

SUMMARY

Data may be stored in a memory as a codeword including the data, a first set of ECC parity bits, and a second set of ECC parity bits. The first set of ECC parity bits may be used to generate decoded data. The decoded data may be re-encoded to generate computed ECC parity bits. The computed ECC parity bits may be compared to the second set of ECC parity bits to verify accuracy of the decoded data.

DETAILED DESCRIPTION

Figure 1:
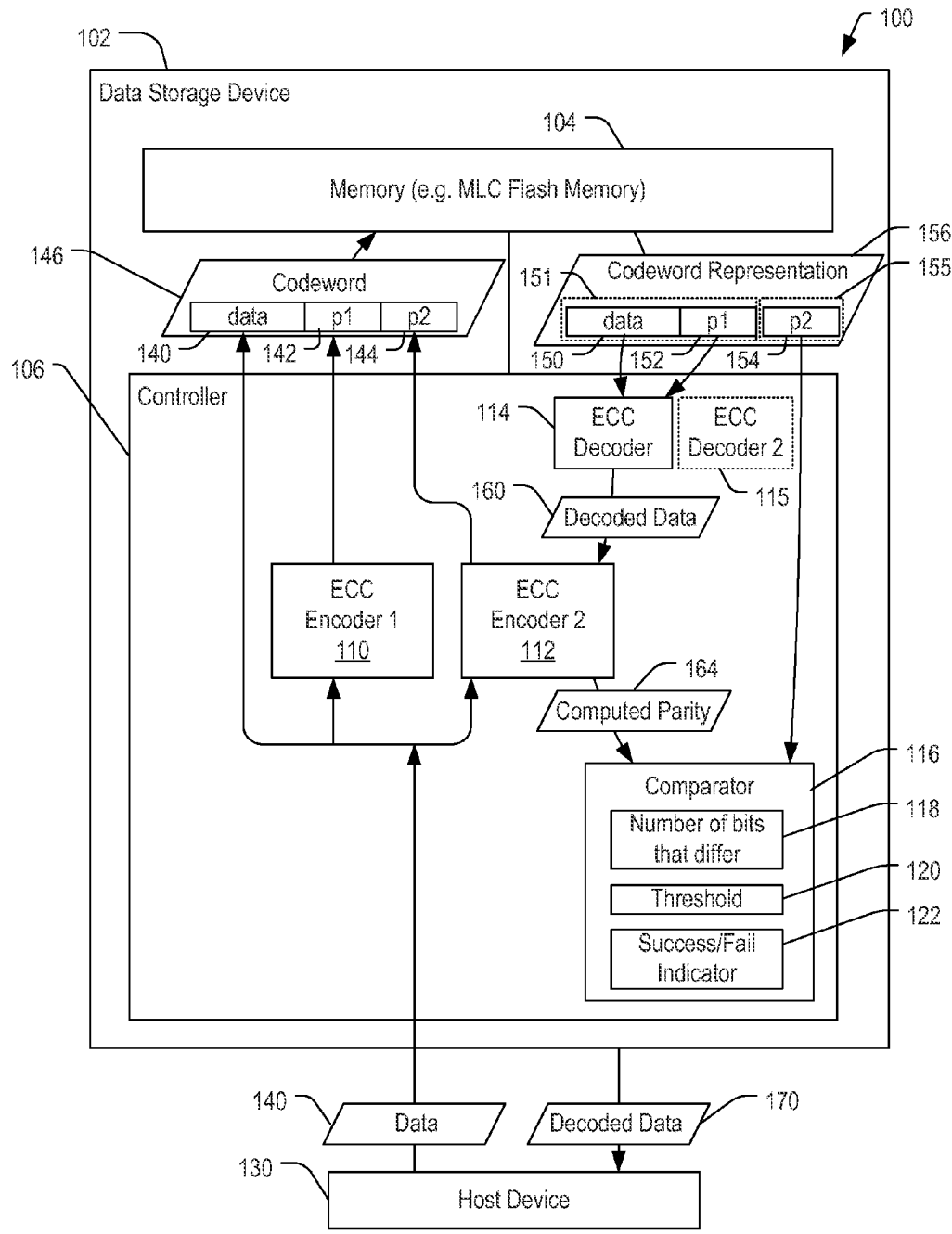
FIG. 1 is a diagram of a particular embodiment of a system that includes a data storage device configured to use ECC encoding to verify an ECC decode operation.

Referring to FIG. 1, a particular illustrative embodiment of a system 100 is depicted that includes a data storage device 102 configured to use ECC encoding to verify an ECC decode operation. The system 100 includes the data storage device 102 coupled to a host device 130. The data storage device 102 includes a memory 104 coupled to a controller 106. The controller 106 is configured to decode data via an ECC decode operation at an ECC decoder 114 and to perform ECC encoding of the decoded data to verify the ECC decode operation.

The host device 130 may be configured to provide data to be stored at the memory 104 or to request data to be read from the memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be a solid state drive (SSD) or embedded memory in the host device 130, such as eMMC® (trademark of JEDEC Solid State Technology Association, Arlington, Va.) memory and eSD memory, as illustrative examples.

The memory 104 may include a flash memory. For example, the memory 104 may be a nonvolatile memory of a flash device, such as a NAND flash device, a NOR flash device, or any other type of flash device. The memory 104 includes multiple storage elements, such as memory cells of a multi-level cell (MLC) memory.

The controller 106 may be configured to receive memory access requests from the host device 130 while the data storage device 102 is operatively coupled to the host device 130. For example, the controller 106 may be configured to receive data 140 from the host device 130, encode the data 140 to generate a codeword 146, and store the codeword 146 at the memory 104. The controller 106 may also be configured to receive a request from the host device 130 to retrieve the data 140. In response, the controller 104 may be configured to read a codeword 156 from the memory 104, decode the codeword representation 156 to correct bit errors that may have occurred in the codeword representation 156, and provide decoded data 170 to the host device 130. The codeword representation 156 may be a representation of the codeword 146, i.e. the codeword representation 156 may differ from the codeword 146 due to one or more bit errors that may have occurred during storage at the memory 104.

The controller 106 includes a first ECC encoder 110, a second ECC encoder 112, an ECC decoder 114, and a comparator 116. In some embodiments, the controller 106 may further include a second ECC decoder 115.

The first ECC encoder 110 is configured to encode data according to a first ECC scheme that uses a first error correcting code to generate parity bits. For example, the first ECC encoder 110 may be responsive to a control signal from the controller 106 to cause the first ECC encoder 110 to read data at a data input of the first ECC encoder 110 and to perform a first ECC encoding operation. For example, the first ECC encoding operation may apply a Reed-Solomon encoding scheme, a Bose Chaudhuri Hocquenghem (BCH) encoding scheme, a Turbo Code encoding scheme, a low density parity check (LDPC) encoding scheme, another type of ECC encoding scheme, or any combination thereof.

The second ECC encoder 112 is configured to encode data according to a second ECC scheme to generate parity bits. For example, the second ECC encoder 112 may be responsive to a control signal from the controller 106 to cause the second ECC encoder 112 to read data at a data input of the second ECC encoder 112 and to perform a second ECC encoding operation. The second ECC encoding operation may apply a Reed-Solomon encoding scheme, a BCH encoding scheme, a Turbo Code encoding scheme, an LDPC encoding scheme, another type of ECC encoding scheme, or any combination thereof. The second ECC encoding operation may be different than the first ECC encoding operation that is performed by the first ECC encoder 110.

The controller 106 is configured to generate the codeword 146 by providing data, such as the data 140, to the first ECC encoder 110 to generate a first set of parity bits (p1) 142 and to the second ECC encoder 112 to generate a second set of parity bits (p2) 144. The controller 106 is configured to store the data 140, the first set of parity bits 142, and the second set of parity bits 144 in the memory 104 as the single codeword 146.

The ECC decoder 114 is configured to receive data bits and parity bits and to perform an ECC decode operation to correct one or more errors that may have occurred in the data bits and in the parity bits. When a number of errors occurring in the data bits and the parity bits is less than an error correction capacity of the ECC decoder 114, the ECC decode operation generates decoded data 160. The ECC decoder 114 is configured to decode the received data bits and parity bits according to a same ECC scheme as used by the first ECC encoder 110. For example, the first ECC encoder 110 may encode data to generate parity bits according to a particular BCH scheme, and the ECC decoder 114 may decode data and parity bits according to the particular BCH scheme.

The controller 106 is configured to read a codeword representation from the memory 104 (the codeword representation 156) and to initiate a decoding operation of a first portion of the codeword representation to generate a set of data bits. To illustrate, the codeword representation 156 may correspond to the codeword 146 with one or more bit errors. The controller 106 may route a first portion 151 of the codeword representation 156 to the ECC decoder 114 to generate a set of data bits (the decoded data 160).

The first portion 151 includes data bits 150 (i.e. a representation of the data bits 140) and first parity bits 152 (i.e. a representation of the first set of parity bits 142). The first portion 151 is associated with a first error correcting code. For example, the first ECC scheme may use the first error correcting code, and the first set of parity bits 142 may be generated by the first ECC encoder 110 to generate an ECC codeword corresponding to the first ECC scheme. The first parity bits 152 may correspond to the first set of parity bits 142 and may include one or more bit errors.

The controller 106 may be configured to initiate an encoding operation of the decoded data 160 according to a second error correcting code to generate computed parity bits 164. For example, the decoded data 160 may be provided as input to the second ECC encoder 112 for encoding according to the second ECC scheme. The second ECC encoder 112 may generate the computed parity bits 164.

The controller 106 may be configured to compare the computed parity bits 164 with a second portion 155 of the codeword representation 156 to determine a number of bits that differ between the computed parity bits 164 and the second portion 155 of the codeword representation 156. For example, the computed parity bits 164 and the second portion 155 may be provided to the comparator 116. The comparator 116 may be configured to perform a bit-wise comparison of the computed parity bits 164 and the second portion 155. The comparator 116 may be configured to determine whether a number 118 of bits that differ between the computed parity bits 164 and the second portion 155 is less than a threshold value 120. The comparator 116 may be configured to generate an indicator 122 of successful decoding or of unsuccessful decoding based on comparing the number 118 to the threshold value 120.

For example, the controller 106 may determine successful decoding of the codeword representation 156 (e.g. the indicator 122 is an indication of successful decoding generated by the comparator 116) in response to the decoding operation at the ECC decoder 114 succeeding and the number 118 of bits that differ not exceeding the threshold value 120. The controller 106 may determine unsuccessful decoding of the codeword representation 156 (e.g. the indicator 122 is an indication of unsuccessful decoding generated by the comparator 116) in response to at least one of the decoding operation failing at the ECC decoder 114 and the number 118 of bits that differ equaling or exceeding the threshold value 120. To illustrate, decoding of the codeword representation 156 may be unsuccessful if the ECC decoder 114 indicates decoding failure (e.g. in response to a number of errors exceeding an error correction capacity of the ECC decoder 114). Decoding of the codeword representation 156 may also be unsuccessful if the ECC decoder 114 does not indicate a decoding failure but the number 118 equals or exceeds the threshold value 120.

During operation, the data storage device 102 may receive the data 140 from the host device 130 while the data storage device 102 is operatively coupled to the host device 130. The controller 106 may provide the data 140 to the first ECC encoder 110 to generate the first set of parity bits 142. The controller 106 may also provide the data 140 to the second ECC encoder 112 to generate the second set of parity bits 144. Encoding at the first ECC encoder 110 may be performed prior to encoding at the second ECC encoder 112 (e.g. in a pipelined or serial configuration). Alternatively, encoding at the first ECC encoder 110 may at least partially overlap in time with encoding at the second ECC encoder 112 (e.g. encoding at the first ECC encoder 110 is performed at least partially in parallel with encoding at the second ECC encoder 112) to reduce a data write latency.

The codeword 146 including the data 140, the first set of parity bits 142, and the second set of parity bits 144 may be stored at the memory 104. In response to receipt of a request from the host device 130 while the host device 130 is operatively coupled to the data storage device 102, the controller 106 may read the codeword representation 156 from the memory 104.

The controller 106 may provide the first portion 151, including the data bits 150 and the first parity bits 152, to the ECC decoder 114, and the ECC decoder 114 may generate the decoded data 160. Although the decoded data 160 may be generated as a successful decode operation, in some cases the decoded data 160 may not match the originally encoded data 140.

Error detection using ECC encoding may be performed by encoding the decoded data 160 using the second ECC encoder 112 to generate the computed parity bits 164. The computed parity bits 164 may be compared to the second parity bits 154 (in the second portion 155 of the codeword representation 156). The indicator 122 is generated and may be evaluated to determine whether the decoded data 160 was successfully decoded or not successfully decoded.

The controller 106 therefore uses ECC encoding (performed by the second ECC encoder 112 encoding the decoded data 160 to generate the computed parity bits 164) to perform error detection by comparing the computed parity bits 164 to the second portion 155 of the codeword representation 156. By performing the error detection using ECC encoding, the controller 106 may be able to use a relatively low-power ECC scheme for error correction and may supplement the ECC correction with comparisons of the computed parity bits 164 to the second parity bits 154. For example, the ECC decoder 114 may be designed such that a probability that the ECC decoder 114 indicates success but fails to generate the correct data is $10^{-8}$. By adding the error detection using ECC encoding, an overall probability that an error will be undetected may be reduced to $10^{-20}$ or lower. Therefore, the data storage device 102 may satisfy a specified error detection rate that exceeds an error correction capacity of the low-power ECC scheme.

In an implementation where the controller 106 includes the second ECC decoder 115, if the decode operation at the ECC decoder 114 is determined to be unsuccessful (e.g. when the ECC decoder 114 indicates decoding failure or the number of bits 118 exceeds the threshold 120), the second ECC decoder 115 may be used for additional decoding. For example, the controller 106 may be configured to initiate a second decode operation at the second ECC decoder 115 to decode a second codeword representation that includes the data bits 150 and the second portion 155 of the codeword representation 156. To illustrate, the second ECC decoder 115 may decode representations of codewords that are encoded using the second ECC scheme of the second ECC encoder 112. The second ECC scheme may have a higher error correction capacity than the first ECC scheme. The second ECC scheme may be relatively computationally inexpensive to encode at the second ECC encoder 112 and relatively computationally expensive to decode at the second ECC decoder 115. One example of the second ECC decoder 115 is a joint parity decoder, as described in further detail with respect to Table 1.

FIG. 1 therefore provides an example of a system where information data to be stored or communicated may be encoded in parallel by two encoders: a first encoder that encodes using a first error correction coding scheme 'ECC1' and a second encoder that encodes using a second error correction coding scheme 'ECC2' (e.g. the first ECC encoder 110 and the second ECC encoder 112, respectively, of FIG. 1). Both ECC1 and ECC2 are error correction codes, thus the codeword generated by the two encoders includes a set of information bits (e.g. the data bits 140 of FIG. 1) and two sets of parity bits (e.g. the first set of parity bits 142 and the second set of parity bits 144 of FIG. 1). If not explicitly stated otherwise, the term "codeword" is used herein to describe a set of data bits and two sets of ECC parity bits: one set of ECC parity bits encoded by ECC1 and the other set of parity bits encoded by ECC2.

As an example, a codeword representation may be received to be decoded. A first portion of the codeword representation that is associated with the data bits and the first set of parity bits (e.g. the first portion 151 of FIG. 1) may be decoded by applying an ECC1 decoder to the data bits and to the first set of parity bits. After successful decoding by the ECC1 decoder, the information bits of the decoded codeword are encoded by the ECC2 encoder to generate a set of computed parity bits, such as the computed parity bits 164 of FIG. 1. The computed parity bits are then compared to a second portion of the received codeword representation that includes the stored (received) set of parity bits corresponding to the ECC2 encoding (e.g. the second portion 155 of FIG. 1 is compared to the computed parity bits 164 by the comparator 116). If the two sets of bits (i.e. the computed parity bits and second portion of the codeword representation) match each other, success is declared; otherwise, failure is declared.

According to an embodiment, the term "match" means perfect match, i.e. the computed parity bits are identical to the second portion of the received codeword representation. According to another embodiment, the term "match" means that the number of non-identical bits in the set of computed parity bits and the second portion of the received codeword representation is less than a predefined number "T" (i.e. the Hamming distance between the two sets is less than the predefined number T). According to another embodiment, the term "match" means that the number of non-identical bits in the set of computed parity bits and the second portion of the received codeword representation is less than a certain number "T" that is dynamically computed (i.e. the Hamming distance between the two is less than a dynamically computed number).

ECC error detection using ECC encoding as described with respect to FIG. 1 may take advantage of additional parity bits that are already defined in an ECC system for other purposes. As a result, an error detection system using ECC encoding may be implemented in an ECC system without adding additional redundancy (i.e. no additional bits, such as CRC check bits, are added to codewords).

For example, a system may include a mechanism to store input data by encoding the data separately according to first and second encoding schemes to provide first and second encoded data. The first encoded data and the second encoded data may be stored. Upon retrieving a representation of the stored data, a first decoding scheme may be applied to the representation of the first encoded data to recover the input data. If the first decoding scheme fails, a second decoding scheme may be applied to the representation of the second encoded data to recover the input data. Because the second set of parity bits already exist in the system for the purpose of decoding whenever the first decoder fails, the second set of parity bits may be compared to a computed set of parity bits to implement error detection as described with respect to FIG. 1 without adding additional parity bits to the system.

As another example, joint parity bits may be used for error detection. For example, a data block D of 8 kilobytes (Kb) may be partitioned into 8 sub-blocks ($d_1, d_2, \ldots d_8$) of 1 Kb each. Each of the sub-blocks $d_i$ is encoded by an ECC code to generate parity bits $p_i$. After applying the ECC encoding, the resulting parity bits are partitioned into two sets, $p_{i1}$ and $p_{i2}$. The codewords may be depicted as shown in Table 1, where each row represents a codeword including data bits and parity bits, and the parity bits are partitioned into two sets.

TABLE 1

| Sub-block ($d_i$) | $1^{st}$ Set of ECC Parity Bits ($p_{i1}$) | $2^{nd}$ Set of ECC Parity Bits ($p_{i2}$) |
|---|---|---|
| $d_1$ | $p_{11}$ | $p_{12}$ |
| $d_2$ | $p_{21}$ | $p_{22}$ |
| $d_3$ | $p_{31}$ | $p_{32}$ |
| $d_4$ | $p_{41}$ | $p_{42}$ |
| $d_5$ | $p_{51}$ | $p_{52}$ |
| $d_6$ | $p_{61}$ | $p_{62}$ |
| $d_7$ | $p_{71}$ | $p_{72}$ |
| $d_8$ | $p_{81}$ | $p_{82}$ |
| Joint Parity: | | $P_J$ |

The whole set of parity bits $\{p_{*1}\}$ is denoted as P1 (i.e. the set of parity bits $p_{11}, p_{21}, \ldots,$ and $p_{81}$), and the set of parity bits $\{p_{*2}\}$ is denoted as P2 (i.e. the set of parity bits $p_{12}, p_{22}, \ldots,$ and $p_{82}$). A function of P2 is computed and denoted $P_J$, and the P2 parity bits may be punctured (i.e. removed and discarded, not stored as part of the codeword). $P_J$ may be a column-wise XOR of P2. For example, a first bit of $P_J$ may be a result of an exclusive-OR (XOR) of the first bit of each of the eight $p_{i2}$ entries, a second bit of $P_J$ may be a result of an exclusive-OR (XOR) of the second bit of each of the eight $p_{i2}$ entries, etc. $P_J$ may be only ⅛ of the length of P2, and storing $P_J$ instead of P2 saves valuable memory space. Although Table 1 illustrates an example using eight sub-codes, in other implementations more than eight sub-codes or fewer than eight sub-codes may be used. In addition, although each sub-code is described as 1 Kb, in other implementations the sub-codes may have a size different than 1 Kb.

Decoding of the code of Table 1 may be performed line-by-line using only the small codes of $d_i$ and $p_{i1}$ and may be performed using a low-complexity decoder, such as the ECC decoder 114 of FIG. 1. In case of failure of one or more of the lines, the code may be extended to include all of the eight lines and the $P_J$ bits may be added to generate interconnections between the individual small codes ($d_i$ and $p_{i1}$) on each line i. A high-correction capability decoder (e.g. the second ECC decoder 115 of FIG. 1) may be used to decode and correct the errors in the code. Conventionally, an error detection capability may be increased by including CRC check bits into each of the data lines $d_i$ of Table 1 such that errors that are not detected by the "short" decoder can be detected by a CRC check.

By performing error detection using ECC encoding as described with respect to FIG. 1, no CRC check bits are added to the data lines $d_i$ and instead the $P_J$ parity bits that already exist in the system may be used for error detection. After correctly decoding all of the eight codes by a low-complexity decoder (e.g. the ECC decoder 114), an estimation of the parity bits $P_J$, denoted $P_{JE}$, may be generated by using the data $d_1, d_2, \ldots d_8$ and encoding the data according to the known encoding method. To illustrate, the second ECC encoder 112 may receive the data $d_1, d_2, \ldots d_8$ and may generate an estimation $P_{JE}$ of the joint parity. Comparing $P_{JE}$ with the stored $P_J$ can give an indication of undetected errors in the decoding process. According to an embodiment, if $P_{JE}$ and $P_J$ are not identical, the decoding will be considered a failure. According to another embodiment, if the Hamming distance between $P_{JE}$ and $P_J$ is less than (or equal to) a threshold T, the decoding will be considered as successful, while if the Hamming distance is larger than the threshold, the decoding will be declared as failure. The threshold T may be predefined or may be dynamically defined according to an expected number of errors in $P_J$.

For example, the dynamically computed value of T may be a function of an accumulated number of errors that were detected and corrected by the first decoder. To illustrate, in 'fresh' flash memories (e.g. having a low count of write/erase cycles), a raw error rate is expected to be very small. Therefore, for a fresh flash memory device, the number of errors that are detected and corrected by the first ECC decoder is very low and the dynamically computed number may be set to '1' (i.e. all bits match for decoding success). As a flash memory ages, an error resiliency decreases and an average number of errors detected and corrected by the first ECC decoder may increase, and T may be set to a larger value. In some cases, T may be set to a larger number than an error correction capability of the second ECC.

The data $d_1, d_2, \ldots d_8$ together with the parity bits $p_{11}, p_{21}, \ldots, p_{81}$ form a codeword generated by an ECC encoder ECC1 (e.g. the first ECC encoder 110), where $d_1, d_2, \ldots d_8$ are the data bits and $p_{11}, p_{21}, p_{81}$ are the parity bits. A second codeword may be considered to be generated by an ECC encoder ECC2 (e.g. the second ECC encoder 112) and may include $d_1, d_2, d_8$ as data and $P_J$ as parity bits.

In another embodiment, after (or in parallel with) decoding data bits by using an ECC1 decoder operating on a first portion of the codeword representation (e.g. the first portion 151 of FIG. 1), a second decoder ECC2 is applied to a second portion of the codeword representation (e.g. the data bits 150 and the second set of parity bits 154 of FIG. 1) to decode the data bits. Results of the two decoding operations (e.g. first data bits generated by ECC1 and second data bits generated by ECC2) may be compared. Decoding success may be declared if the results of decoding the data bits match each other.

Figure 2:
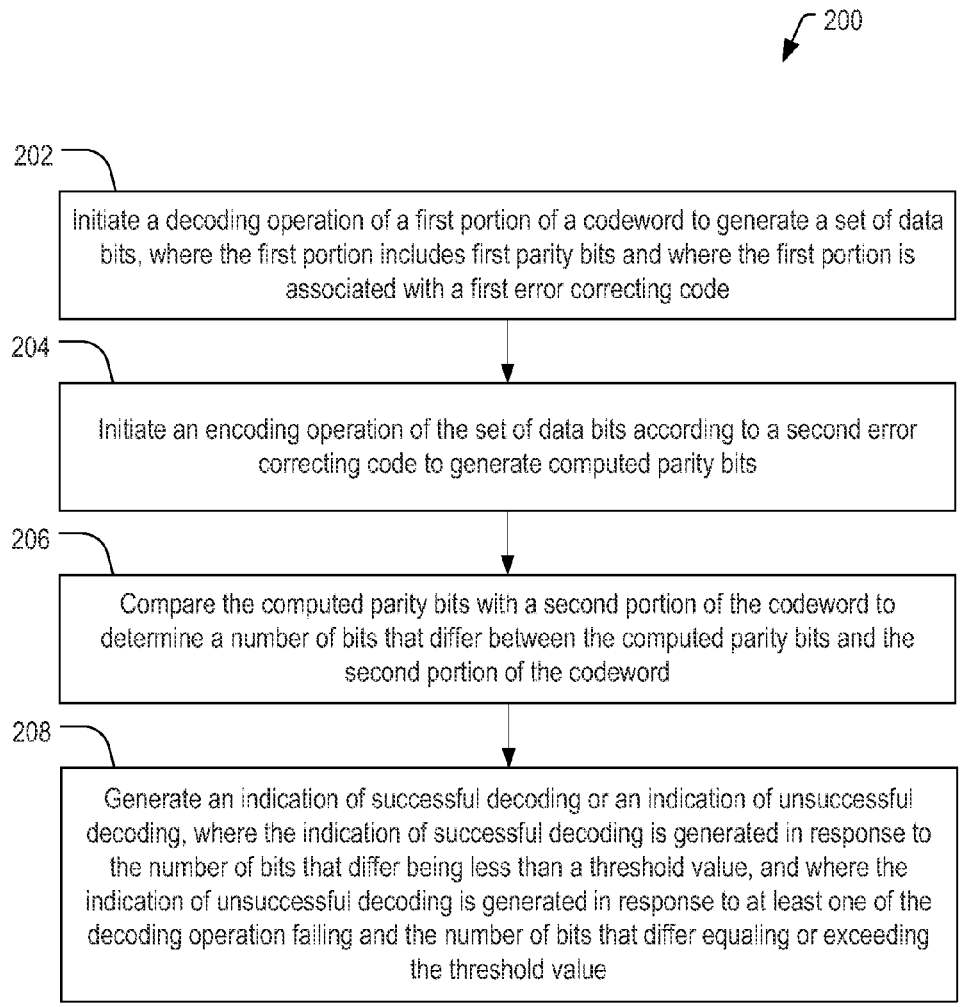
FIG. 2 is a flow diagram of a particular embodiment of a method of using ECC encoding to verify an ECC decode operation.

Referring to FIG. 2, a flow chart of a particular embodiment of a method 200 of error detection is depicted. The method 200 may be performed at a data storage device, such as the data storage device 102 of FIG. 1. The method 200 includes initiating a decoding operation of a first portion of a codeword representation to generate a set of data bits, at 202. The first portion includes first parity bits and the first portion is associated with a first error correcting code. For example, the first portion 151 of the codeword representation 156 corresponds to an ECC codeword generated by the first ECC encoder 110 according to the first error correcting code. The first portion 151 of the codeword representation 156 may be provided to an input of the ECC decoder 114 and a control signal may be provided to a control input of the ECC decoder 114 to cause a decoding operation to be performed to generate the decoded data 160. The codeword representation may be read from a memory of the data storage device. For example, the codeword representation may be read from the memory 104 in response to receipt of a request from a host device 130 while the host device 130 is operatively coupled to the data storage device 102, such as a request from the host device 130 of FIG. 1.

An encoding operation of the set of data bits according to a second error correcting code is initiated to generate computed parity bits, at 204 For example, the decoded data 160 of FIG. 1 may be provided to an input of the second ECC encoder 112 and a control signal may be provided to a control input of the second ECC encoder 112 to cause an encoding operation to be performed to generate the computed parity bits 164.

The computed parity bits are compared with a second portion of the codeword representation to determine a number of bits that differ between the computed parity bits and the second portion of the codeword representation, at 206. For example, the computed parity bits 164 of FIG. 1 are compared with the second portion 155 of the codeword representation 156 at the comparator 116.

An indication of successful decoding or an indication of unsuccessful decoding is generated, at 208. For example, the comparator 116 of FIG. 1 may generate the success/fail indicator 118. The indication of successful decoding may be generated in response to the decoding operation succeeding and the number of bits that differ being less than a threshold value. The indication of unsuccessful decoding may be generated in response to at least one of: (1) the decoding operation failing and (2) the number of bits that differ equaling or exceeding the threshold value.

The threshold value may be a predefined value. For example, the threshold value may be one, indicating that decoding is unsuccessful if any bits differ between the computed parity bits and the second portion of the codeword representation. As another example, the threshold value may be greater than one. The threshold value may be larger than an error correction capability of the second error correcting code. For example, the first ECC encoding may have a multiple-bit correction capability and the second ECC encoding may have a single-bit correction capability. If an error rate indicated by an average number of errors that are corrected by the ECC decoder 114 of FIG. 1 corresponds to two errors in the second parity (i.e. based on the number of corrected errors in the first portion 151, the second portion 155 is expected to have two errors), the threshold may be set to a number greater than one, such as two or three, as illustrative examples.

The threshold value may be a dynamically determined value. The threshold value may be determined as a function of a number of errors that are detected and corrected during the first decode operation. To illustrate, an error rate may be determined by the controller 106 of FIG. 1 based on an average number of errors that are corrected by the ECC decoder 114 during one or more decode operations, and the error rate may be used to determine a number of errors expected in the second portion 155.

A second decode operation may be initiated to decode a second codeword representation that includes the data bits and the second portion of the codeword. For example, the decode operation may use a first decoder (e.g. the ECC decoder 114 of FIG. 1) and the second decode operation may use a second decoder (e.g. the second ECC decoder 115 of FIG. 1). As another example, the decode operation may be performed at the first decoder in a lower power mode and the second decoder operation may be performed at the first decoder in higher strength mode.

The codeword may have been stored to the memory prior to reading the codeword representation from the memory by receiving data to be stored to the memory, performing a first error correction coding (ECC) encode operation of the data to generate a first set of parity bits, and performing a second ECC encode operation of the data to generate a second set of parity bits. The data, the first set of parity bits, and the second set of parity bits may be stored to the memory as the codeword. For example, the codeword 146 of FIG. 1 includes the data 140, the first set of parity bits 142 generated by the first ECC encoder 110, and the second set of parity bits 144 generated by the second ECC encoder 112. The codeword 146 may be stored to the memory 104 prior to the codeword representation 156 being read from the memory 104.

By performing the error detection using ECC encoding, an error detection capability may exceed an error correction capability of the first error correcting code. For example, the decoding operation may have a probability of $10^{-15}$ of indicating success while failing to generate the correct data. By comparing the computed parity bits to the second portion of the codeword representation, an overall probability that an error will be undetected may be reduced to $10^{-20}$ or lower. Therefore, a specified error detection rate that exceeds an error correction capacity of first error correcting code may be satisfied.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof. For example, one or more of the first ECC encoder 110, the second ECC encoder 112, the ECC decoder 114, the second ECC decoder 115, or the comparator 116 of FIG. 1 may represent physical components, such as processors, state machines, logic circuits, or other structures to enable error detection by comparing computed ECC parity bits to a second set of ECC parity bits in a codeword.

One or more of the first ECC encoder 110, the second ECC encoder 112, the ECC decoder 114, the second ECC decoder 115, or the comparator 116 of FIG. 1 may be implemented using a microprocessor or microcontroller. In a particular embodiment, the ECC decoder 114 is implemented by a processor executing instructions that are stored at the memory 104 or stored at a separate memory location that is not part of the memory 104, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive or removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of non-volatile memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   at a data storage device, performing:
      initiating by a controller of the data storage device, a first decoding operation of a first portion of a codeword representation to generate a set of data bits, wherein the first portion includes first parity bits, and wherein the first portion is associated with a first error correcting code;
      initiating, by the controller, an encoding operation of the set of data bits according to a second error correcting code to generate computed parity bits; and
      comparing the computed parity bits with a second portion of the codeword representation to determine a number of bits that differ between the computed parity bits and the second portion of the codeword representation.

2. The method of claim 1, further comprising initiating, by the controller, a second decoding operation to decode a second codeword representation that includes representative data bits and the second portion of the codeword representation, wherein the first decoding operation uses a first decoder, and wherein the second decoding operation uses a second decoder.

3. The method of claim 2, wherein the second decoder is a joint parity decoder.

4. The method of claim 1, further comprising reading the codeword representation from a memory of the data storage device, wherein the encoding operation is performed by an encoder.

5. The method of claim 4, wherein the codeword representation is read from the memory in response to receipt of a request from a host device while the host device is operatively coupled to the data storage device.

6. The method of claim 4, wherein the codeword representation corresponds to a codeword, and further comprising, prior to reading the codeword representation from the memory:
receiving data to be stored to the memory;
performing a first error correction coding (ECC) encode operation of the data to generate a first set of parity bits; and
performing a second ECC encode operation of the data to generate a second set of parity bits,
wherein the data, the first set of parity bits, and the second set of parity bits are stored to the memory as the codeword.

7. The method of claim 1, wherein the first portion of the codeword representation corresponds to multiple sub-codes, each sub-code of the multiple sub-codes including a corresponding sub-set of a set of representative data bits and a corresponding sub-set of the first parity bits, and wherein the second portion of the codeword representation corresponds to joint parity bits based on punctured parity bits of each sub-code of the multiple sub-codes.

8. The method of claim 7, wherein the encoding operation includes:
encoding each of the corresponding sub-sets of the set of representative data bits to generate a corresponding set of generated parity bits;
partitioning each of the sets of generated parity bits into a first partition and a second partition, the first partition corresponding to the first parity bits and the second partition corresponding to second parity bits; and
generating the computed parity bits as estimated joint parity bits based on the second partitions of each of the sets of the generated parity bits.

9. The method of claim 1, further comprising generating one of an indication of successful decoding and an indication of unsuccessful decoding, wherein the indication of successful decoding is generated in response to the number of the bits that differ being less than a threshold value, and wherein the indication of unsuccessful decoding is generated in response to at least one of the first decoding operation failing and the number of the bits that differ equaling or exceeding the threshold value.

10. The method of claim 9, wherein the threshold value is a predefined value.

11. The method of claim 10, wherein the threshold value is greater than one.

12. The method of claim 11, wherein the threshold value is larger than an error correction capability of the second error correcting code.

13. The method of claim 9, wherein the threshold value is a dynamically determined value.

14. The method of claim 13, wherein the threshold value is determined as a function of a number of errors that are detected and corrected during the first decoding operation of the first portion.

15. A data storage device comprising:
a memory; and
a controller configured to read a codeword representation from the memory and to initiate a first decoding operation of a first portion of the codeword representation to generate a set of data bits, wherein the first portion includes first parity bits and wherein the first portion is associated with a first error correcting code, to initiate an encoding operation of the set of data bits according to a second error correcting code to generate computed parity bits, and to compare the computed parity bits with a second portion of the codeword representation to determine a number of bits that differ between the computed parity bits and the second portion of the codeword representation.

16. The data storage device of claim 15, wherein the controller is further configured to determine successful decoding of the codeword representation in response to the number of the bits that differ being less than a threshold value.

17. The data storage device of claim 16, wherein the threshold value is a predefined value.

18. The data storage device of claim 17, wherein the threshold value is greater than one.

19. The data storage device of claim 18, wherein the threshold value is larger than an error correction capability of the second error correcting code.

20. The data storage device of claim 16, wherein the threshold value is a dynamically determined value.

21. The data storage device of claim 20, wherein the threshold value is determined as a function of a number of errors that are detected and corrected during the first decoding operation.

22. The data storage device of claim 15, wherein the controller includes a first decoder configured to perform the first decoding operation and further includes a second decoder, wherein the controller is configured to initiate a second decoding operation at the second decoder to decode a second codeword representation that includes representative data bits and the second portion of the codeword representation.

23. The data storage device of claim 22, wherein the second decoding operation includes the representative data bits of the second portion, and wherein the second decoding operation is performed in response to an indication that the first decoding operation failed.

24. The data storage device of claim 15, wherein the controller is configured to read the codeword representation from the memory in response to receipt of a request from a host device while the host device is operatively coupled to the data storage device.

25. The data storage device of claim 15, wherein the memory includes a flash memory.

* * * * *